US012347315B2

(12) United States Patent
Valcarcel et al.

(10) Patent No.: US 12,347,315 B2
(45) Date of Patent: Jul. 1, 2025

(54) SYSTEMS AND METHODS FOR PARKING MANAGEMENT

(71) Applicant: Selex ES Inc., Greensboro, NC (US)

(72) Inventors: Julio Valcarcel, Greensboro, NC (US); Todd Child, Greensboro, NC (US)

(73) Assignee: Leonardo US Cyber and Security Solutions LLC, Greensboro, NC (US)

( * ) Notice: Subject to any disclaimer, the term of this patent is extended or adjusted under 35 U.S.C. 154(b) by 172 days.

(21) Appl. No.: 18/098,850

(22) Filed: Jan. 19, 2023

(65) Prior Publication Data

US 2023/0237907 A1  Jul. 27, 2023

Related U.S. Application Data

(60) Provisional application No. 63/302,244, filed on Jan. 24, 2022.

(51) Int. Cl.
*G08G 1/14* (2006.01)
*G06V 20/62* (2022.01)

(52) U.S. Cl.
CPC .......... *G08G 1/146* (2013.01); *G06V 20/625* (2022.01)

(58) Field of Classification Search
CPC .................. G08G 1/146; G06V 20/625
See application file for complete search history.

(56) References Cited

U.S. PATENT DOCUMENTS

| | | |
|---|---|---|
| 3,656,111 A | 4/1972 | Royster, Sr. |
| 4,843,463 A | 6/1989 | Michetti |
| 6,140,941 A | 10/2000 | Dwyer et al. |
| 6,340,935 B1 | 1/2002 | Hall |
| 6,538,580 B2 | 3/2003 | Bostrom |
| 6,650,765 B1 | 11/2003 | Alves |
| 6,754,368 B1 | 6/2004 | Cohen |
| 6,844,841 B1 | 1/2005 | Masciulli |
| 6,922,138 B2 | 7/2005 | Melvin |
| 6,959,869 B2 | 11/2005 | Tsikos et al. |
| 6,982,654 B2 | 1/2006 | Rau et al. |
| 7,046,169 B2 | 5/2006 | Bucholz et al. |
| 7,173,526 B1 | 2/2007 | Monroe |

(Continued)

FOREIGN PATENT DOCUMENTS

| | | |
|---|---|---|
| AU | 2013201309 B2 | 8/2014 |
| CA | 2620630 C | 9/2014 |

(Continued)

OTHER PUBLICATIONS

Yaacoub, et al.; Security analysis of drones systems: Attacks, limitations, and recommendations; Internet of Things 11 (2020) 100218; Elsevier; www.elsevier.com/locate/iot; Retrieved on Apr. 17, 2023 (Apr. 17, 2023) from https://www.ncbi.nlm.nih.gov/pmc/articles/PMC7206421/.

(Continued)

*Primary Examiner* — Mohamed Barakat
(74) *Attorney, Agent, or Firm* — Womble Bond Dickinson (US) LLP (57) ABSTRACT

A system and method to manage a parking area. The system may include one or more tags; a license plate reader configured to read license plates; and a tag reader configured to, in response to a license plate read by the license plate reader, read the tag and determine whether the read license plate belongs to an authorized or unauthorized vehicle.

30 Claims, 6 Drawing Sheets

(56) References Cited

U.S. PATENT DOCUMENTS

| | | |
|---|---|---|
| 7,227,974 B2 | 6/2007 | Kamijo et al. |
| 7,342,511 B2 | 3/2008 | Schuette |
| 7,344,284 B2 | 3/2008 | Lynam et al. |
| 7,382,280 B2 | 6/2008 | Long |
| 7,460,028 B2 | 12/2008 | Garibotto et al. |
| 7,465,108 B2 | 12/2008 | Brown |
| 7,482,910 B2 | 1/2009 | Melvin |
| 7,504,965 B1 | 3/2009 | Windover et al. |
| 7,535,793 B2 | 5/2009 | Frantz |
| 7,825,829 B2 | 11/2010 | Madsen |
| 7,868,912 B2 | 1/2011 | Venetianer |
| 7,889,931 B2 | 2/2011 | Webb et al. |
| 7,920,626 B2 | 4/2011 | Fernandez |
| 8,068,154 B2 | 11/2011 | Jacob et al. |
| 8,117,090 B2 | 2/2012 | Romero |
| 8,243,140 B1 | 8/2012 | Howe |
| 8,408,772 B2 | 4/2013 | Li |
| 8,447,112 B2 | 5/2013 | Paul et al. |
| 8,666,801 B2 | 3/2014 | Cho |
| 8,693,733 B1 | 4/2014 | Harrison |
| 8,704,889 B2 | 4/2014 | Hofman |
| 8,774,465 B2 | 7/2014 | Christopulos et al. |
| 8,781,169 B2 | 7/2014 | Jackson et al. |
| 8,817,098 B2 | 8/2014 | Millar |
| 8,953,044 B2 | 2/2015 | Wu et al. |
| 8,983,137 B2 | 3/2015 | Hradetzky |
| 9,058,619 B2 | 6/2015 | Nandakumar et al. |
| 9,141,503 B1 | 9/2015 | Chen |
| 9,158,954 B2 | 10/2015 | Thuries et al. |
| 9,171,382 B2 | 10/2015 | Nerayoff et al. |
| 9,245,203 B2 | 1/2016 | Hofman et al. |
| 9,280,895 B2 | 3/2016 | Wang et al. |
| 9,327,685 B1 | 5/2016 | Wooten |
| 9,342,934 B2 | 5/2016 | Chen |
| 9,426,345 B1 | 8/2016 | Turner, Jr. et al. |
| 9,436,880 B2 | 9/2016 | Bos et al. |
| 9,471,838 B2 | 10/2016 | Miller et al. |
| 9,477,917 B1 * | 10/2016 | Koch .............. G06K 17/0022 |
| 9,491,420 B2 | 11/2016 | Mimar |
| 9,495,869 B2 | 11/2016 | Bhogal et al. |
| 9,497,393 B2 | 11/2016 | Reed et al. |
| 9,538,060 B1 | 1/2017 | Cilia |
| 9,542,609 B2 | 1/2017 | Wu et al. |
| 9,594,158 B2 | 3/2017 | Abl |
| 9,607,510 B1 | 3/2017 | DeLorean |
| 9,652,666 B2 | 5/2017 | Nerayoff et al. |
| 9,685,084 B2 | 6/2017 | Scholl et al. |
| 9,715,703 B2 | 7/2017 | Robinson et al. |
| 9,779,309 B1 | 10/2017 | Fink et al. |
| 9,796,331 B2 | 10/2017 | Karner et al. |
| 9,818,157 B2 | 11/2017 | McCall et al. |
| 9,846,883 B2 | 12/2017 | Angell et al. |
| 9,858,493 B2 | 1/2018 | Tseng |
| 9,911,297 B2 | 3/2018 | Lundy |
| 9,972,230 B1 | 5/2018 | DeLorean |
| 9,990,376 B2 | 6/2018 | Voeller et al. |
| 9,996,861 B2 | 6/2018 | Ryan et al. |
| 10,027,361 B2 | 7/2018 | Griffin |
| 10,032,212 B2 | 7/2018 | Winkelman et al. |
| 10,055,906 B1 | 8/2018 | Fournier et al. |
| 10,057,713 B1 | 8/2018 | Rackley, III et al. |
| 10,089,869 B1 | 10/2018 | Makled et al. |
| 10,121,172 B2 * | 11/2018 | Hudson .............. G06Q 30/0284 |
| 10,127,437 B2 | 11/2018 | Bhanu et al. |
| 10,140,488 B1 | 11/2018 | Bondarenko et al. |
| 10,152,858 B2 | 12/2018 | Boykin |
| 10,164,974 B2 | 12/2018 | Spencer et al. |
| 10,198,954 B2 | 2/2019 | Holtzman et al. |
| 10,217,034 B2 | 2/2019 | Hoshino |
| 10,223,609 B2 | 3/2019 | Bhanu et al. |
| 10,373,226 B1 * | 8/2019 | Russell .............. G06Q 30/0635 |
| 10,417,816 B2 | 9/2019 | Satzoda et al. |
| 10,559,200 B1 | 2/2020 | Langley et al. |
| 10,691,968 B2 | 6/2020 | Blais-Morin et al. |
| 10,872,524 B2 | 12/2020 | Kienitz et al. |
| 11,030,892 B1 | 6/2021 | Langley et al. |
| 11,080,533 B2 | 8/2021 | Camilus et al. |
| 11,243,959 B1 | 2/2022 | Gilboa |
| 11,941,716 B2 | 3/2024 | Child et al. |
| 2002/0089157 A1 | 7/2002 | Breed et al. |
| 2002/0186148 A1 | 12/2002 | Trajkovic et al. |
| 2003/0131011 A1 | 7/2003 | Haunschild et al. |
| 2004/0218052 A1 | 11/2004 | DiDomenico et al. |
| 2005/0012817 A1 | 1/2005 | Hampapur |
| 2005/0065711 A1 | 3/2005 | Dahlgren et al. |
| 2006/0007308 A1 | 1/2006 | Ide |
| 2006/0028556 A1 | 2/2006 | Bunn et al. |
| 2006/0030985 A1 | 2/2006 | Lawida et al. |
| 2006/0106659 A1 | 5/2006 | Santos et al. |
| 2006/0109083 A1 | 5/2006 | Rathus et al. |
| 2006/0180647 A1 | 8/2006 | Hansen |
| 2006/0269105 A1 | 11/2006 | Langlinais |
| 2006/0278705 A1 | 12/2006 | Hedley et al. |
| 2007/0008129 A1 | 1/2007 | Soliman |
| 2007/0009136 A1 | 1/2007 | Pawlenko et al. |
| 2007/0069921 A1 | 3/2007 | Sefton |
| 2007/0112620 A1 * | 5/2007 | Johnson .............. G07B 15/00 705/13 |
| 2007/0229307 A1 | 10/2007 | Pawlenko et al. |
| 2007/0291118 A1 | 12/2007 | Shu et al. |
| 2008/0045245 A1 | 2/2008 | Billmaier et al. |
| 2008/0117296 A1 | 5/2008 | Egnal et al. |
| 2008/0285803 A1 | 11/2008 | Madsen |
| 2009/0088924 A1 | 4/2009 | Coffee et al. |
| 2009/0161913 A1 | 6/2009 | Son |
| 2010/0066537 A1 | 3/2010 | Weller et al. |
| 2010/0088123 A1 | 4/2010 | McCall et al. |
| 2010/0195871 A1 | 8/2010 | Simon |
| 2010/0245582 A1 | 9/2010 | Harel |
| 2010/0283662 A1 | 11/2010 | Fox |
| 2011/0053559 A1 | 3/2011 | Klein |
| 2011/0134240 A1 | 6/2011 | Anderson et al. |
| 2011/0228085 A1 | 9/2011 | Hofman |
| 2011/0228253 A1 | 9/2011 | Batten et al. |
| 2011/0267222 A1 | 11/2011 | Craig |
| 2011/0313644 A1 | 12/2011 | Grassi |
| 2012/0106801 A1 | 5/2012 | Jackson |
| 2012/0140079 A1 | 6/2012 | Millar |
| 2012/0155712 A1 | 6/2012 | Paul et al. |
| 2013/0082828 A1 | 4/2013 | Furey et al. |
| 2013/0093886 A1 | 4/2013 | Rothschild |
| 2013/0129152 A1 | 5/2013 | Rodriguez Serrano et al. |
| 2013/0132166 A1 | 5/2013 | Wu et al. |
| 2013/0135468 A1 | 5/2013 | Kim |
| 2013/0282448 A1 | 10/2013 | Rydbeck et al. |
| 2013/0303189 A1 | 11/2013 | Bennett |
| 2013/0306728 A1 | 11/2013 | Thuries et al. |
| 2013/0308003 A1 | 11/2013 | Raghavan |
| 2013/0325629 A1 | 12/2013 | Harrison |
| 2014/0046800 A1 | 2/2014 | Chen |
| 2014/0066089 A1 | 3/2014 | Monks |
| 2014/0093125 A1 | 4/2014 | Hradetzky |
| 2014/0126779 A1 | 5/2014 | Duda |
| 2014/0139660 A1 | 5/2014 | Zhu |
| 2014/0159925 A1 | 6/2014 | Mimeault et al. |
| 2014/0160283 A1 | 6/2014 | Hofman et al. |
| 2014/0225719 A1 | 8/2014 | Kesavan et al. |
| 2014/0241585 A1 | 8/2014 | Zafiroglu et al. |
| 2014/0254866 A1 | 9/2014 | Jankowski et al. |
| 2014/0254877 A1 | 9/2014 | Jankowski et al. |
| 2014/0254878 A1 | 9/2014 | Jankowski et al. |
| 2014/0334684 A1 | 11/2014 | Strimling |
| 2015/0049914 A1 | 2/2015 | Alves |
| 2015/0054676 A1 | 2/2015 | Vinski et al. |
| 2015/0113012 A1 | 4/2015 | Silver |
| 2015/0119069 A1 | 4/2015 | Harris et al. |
| 2015/0123794 A1 | 5/2015 | Hamalainen et al. |
| 2015/0138001 A1 * | 5/2015 | Davies .............. G08G 1/146 340/932.2 |
| 2015/0149465 A1 | 5/2015 | Unser et al. |
| 2015/0154669 A1 | 6/2015 | Wu et al. |
| 2015/0205868 A1 | 7/2015 | Boncyk et al. |
| 2015/0294373 A1 | 10/2015 | Schuh |
| 2015/0310293 A1 | 10/2015 | Dehart |

(56) References Cited

U.S. PATENT DOCUMENTS

| | | |
|---|---|---|
| 2015/0317687 A1 | 11/2015 | Ramesh et al. |
| 2015/0348342 A1 | 12/2015 | Baxley et al. |
| 2015/0356498 A1* | 12/2015 | Casanova ............ G07B 15/02 705/13 |
| 2015/0381946 A1 | 12/2015 | Renkis |
| 2015/0381948 A1 | 12/2015 | Renkis |
| 2016/0021344 A1 | 1/2016 | Renkis |
| 2016/0098864 A1 | 4/2016 | Nawrocki |
| 2016/0110759 A1 | 4/2016 | Polehn et al. |
| 2016/0112461 A1 | 4/2016 | Othmer |
| 2016/0124071 A1 | 5/2016 | Baxley et al. |
| 2016/0266579 A1 | 9/2016 | Chen |
| 2016/0343252 A1 | 11/2016 | Davies et al. |
| 2016/0344979 A1 | 11/2016 | Renkis |
| 2017/0018170 A1 | 1/2017 | Sayavong et al. |
| 2017/0032666 A1 | 2/2017 | Pretorius et al. |
| 2017/0048376 A1 | 2/2017 | Logan |
| 2017/0061506 A1 | 3/2017 | Dow et al. |
| 2017/0124395 A1 | 5/2017 | Cohen et al. |
| 2017/0126648 A1 | 5/2017 | Bond et al. |
| 2017/0131202 A1 | 5/2017 | McClintock et al. |
| 2017/0140237 A1 | 5/2017 | Voeller et al. |
| 2017/0186317 A1 | 6/2017 | Franklin et al. |
| 2017/0193810 A1 | 7/2017 | Cao et al. |
| 2017/0206559 A1 | 7/2017 | Bakshi et al. |
| 2017/0308964 A1 | 10/2017 | Morris et al. |
| 2017/0330455 A1 | 11/2017 | Kikuchi et al. |
| 2017/0339529 A1 | 11/2017 | Buttolo et al. |
| 2017/0357662 A1 | 12/2017 | Knany et al. |
| 2017/0357881 A1 | 12/2017 | Hoshino |
| 2017/0365105 A1 | 12/2017 | Rao et al. |
| 2017/0372143 A1 | 12/2017 | Barcus et al. |
| 2017/0374324 A1 | 12/2017 | Loftus |
| 2018/0032590 A1 | 2/2018 | Recavarren |
| 2018/0072177 A1 | 3/2018 | Tremblay |
| 2018/0096595 A1 | 4/2018 | Janzen et al. |
| 2018/0103348 A1 | 4/2018 | Malone |
| 2018/0107528 A1 | 4/2018 | Vizer et al. |
| 2018/0107892 A1 | 4/2018 | Istenes |
| 2018/0137356 A1 | 5/2018 | Nerayoff et al. |
| 2018/0144382 A1 | 5/2018 | Makke et al. |
| 2018/0165935 A1 | 6/2018 | VanBlon et al. |
| 2018/0174457 A1 | 6/2018 | Taylor |
| 2018/0197416 A1 | 7/2018 | Hyde et al. |
| 2018/0211115 A1 | 7/2018 | Klein |
| 2018/0211116 A1 | 7/2018 | Modi et al. |
| 2018/0211117 A1 | 7/2018 | Ratti |
| 2018/0247519 A1 | 8/2018 | Bekanich |
| 2018/0253805 A1 | 9/2018 | Kelly et al. |
| 2018/0300578 A1 | 10/2018 | Wilbert et al. |
| 2018/0328757 A1 | 11/2018 | Chan et al. |
| 2018/0349699 A1 | 12/2018 | O'Connell et al. |
| 2018/0350230 A1 | 12/2018 | Kienitz et al. |
| 2018/0357247 A1 | 12/2018 | Siminoff et al. |
| 2019/0031146 A1 | 1/2019 | Etonye |
| 2019/0039463 A1 | 2/2019 | Moghe et al. |
| 2019/0043355 A1 | 2/2019 | Ferguson et al. |
| 2019/0050634 A1 | 2/2019 | Nerayoff et al. |
| 2019/0050652 A1 | 2/2019 | Baker et al. |
| 2019/0051142 A1 | 2/2019 | Wiles |
| 2019/0057601 A1 | 2/2019 | Watanabe et al. |
| 2019/0087864 A1 | 3/2019 | Hacker |
| 2019/0147260 A1 | 5/2019 | May |
| 2019/0147306 A1 | 5/2019 | Hoshino |
| 2019/0163982 A1 | 5/2019 | Block |
| 2019/0244498 A1 | 8/2019 | Dumas |
| 2019/0294890 A1 | 9/2019 | Kanga |
| 2019/0311327 A1* | 10/2019 | Habbaba .......... G06Q 10/08355 |
| 2019/0325230 A1 | 10/2019 | Nadler |
| 2019/0329421 A1* | 10/2019 | Deyle .................. B25J 13/086 |
| 2020/0097735 A1 | 3/2020 | Altuev |
| 2020/0104566 A1 | 4/2020 | Yamada et al. |
| 2020/0111350 A1 | 4/2020 | Julian et al. |
| 2020/0162701 A1 | 5/2020 | Nixon et al. |
| 2020/0211345 A1 | 7/2020 | Gordon-Carroll et al. |
| 2020/0265258 A1 | 8/2020 | Blais-Morin et al. |
| 2021/0026019 A1 | 1/2021 | Gahagan et al. |
| 2021/0044959 A1 | 2/2021 | Beaurepaire |
| 2021/0225161 A1 | 7/2021 | Horn |
| 2021/0326563 A1 | 10/2021 | Kossor |
| 2021/0398298 A1 | 12/2021 | Kisara |
| 2022/0141426 A1 | 5/2022 | Kim et al. |
| 2022/0148320 A1 | 5/2022 | Alakarhu |
| 2022/0188953 A1 | 6/2022 | Child et al. |
| 2022/0294946 A1 | 9/2022 | D'Annunzio |
| 2023/0010292 A1 | 1/2023 | Simon |
| 2023/0046309 A1 | 2/2023 | May |
| 2023/0070108 A1 | 3/2023 | Child |
| 2023/0073717 A1 | 3/2023 | Child |
| 2023/0073876 A1 | 3/2023 | Child |
| 2023/0162310 A1 | 5/2023 | Child et al. |
| 2023/0177954 A1 | 6/2023 | Neff et al. |
| 2023/0196780 A1 | 6/2023 | Nieuwkerk et al. |
| 2023/0274647 A1 | 8/2023 | Nieuwkerk et al. |
| 2024/0021092 A1 | 1/2024 | Child |
| 2024/0185371 A1 | 6/2024 | Child et al. |

FOREIGN PATENT DOCUMENTS

| | | |
|---|---|---|
| CA | 2916418 A1 | 6/2017 |
| CA | 3000127 A1 | 6/2018 |
| CA | 2924997 C | 6/2021 |
| CA | 2979406 C | 2/2024 |
| CN | 102708693 A | 10/2012 |
| CN | 203050715 U | 7/2013 |
| DE | 102005035242 A1 | 2/2007 |
| EP | 0784838 B1 | 6/2000 |
| EP | 1993279 A2 | 11/2008 |
| EP | 3726253 A1 | 10/2020 |
| EP | 3989194 A1 | 4/2022 |
| FR | 2975210 A3 | 11/2012 |
| GB | 2328731 A | 3/1999 |
| IN | 282920 B | 5/2017 |
| SG | 140858 A1 | 4/2008 |
| TW | 201935419 A * | 9/2019 |
| WO | WO2004/027730 A1 | 4/2004 |
| WO | WO2007/032025 A2 | 3/2007 |
| WO | WO2008/088880 A1 | 7/2008 |
| WO | WO2011/023024 A1 | 3/2011 |
| WO | WO2012/038964 A2 | 3/2012 |
| WO | WO2014/152923 A1 | 9/2014 |
| WO | WO2015/193903 A2 | 12/2015 |
| WO | WO2017/180900 A1 | 10/2017 |
| WO | WO2018/009567 A1 | 1/2018 |
| WO | WO2019/043444 A1 | 3/2019 |
| WO | WO2019/043446 A1 | 3/2019 |
| WO | WO2019/099149 A1 | 5/2019 |
| WO | WO2019/162970 A1 | 8/2019 |
| WO | WO2020/145882 A1 | 7/2020 |

OTHER PUBLICATIONS

Valera, M. and Velastin, S.A., "Intelligent distributed surveillance systems: a review", Source: vol. 152, Issue 2, Apr. 2005, p. 192-204, DOI: 10. 1049/ip-vis:20041147, Print ISSN 1350-245X, Online ISSN 1359-7108; 13 pages; 2005.

Hampapur, A.; "smart video surveillance: exploring the concept of multiscale spatiotemporal tracking", Published in: IEEE Signal Processing Magazine (vol. 22, Issue: 2, Mar. 2005), pp. 38-51; 2005.

Girgensohn, Andreas, "DOTS: Support for Effective Video Surveillance", MM '07: Proceedings of the 15$^{th}$ ACM International conference on Multimedia Sep. 2007; pp. 423-432; 2007.

Notification re International Search Report and Written Opinion; related Application No. PCT/US23/11130 dated May 3, 2023.

Makarov, A., et al.; Authenticating Vehicles and Drivers in Motion Based on Computer Vision and RFID Tags; 2012 IEEE 10$^{th}$ Jubilee International Symposium on Intelligent Systems and Informatics; IEEE 2012; Year 2012.

Howington, Larry C .; Automated License Plate Reading; Development and use of Perceptics multi-purpose License Plate Reader Technology; Sep. 1989.

(56) References Cited

OTHER PUBLICATIONS

Waters, Rebecca; Automated License Plate Recognition: An Insider's Look; P&SN Police and Security News 2022; Posted by Publisher—Sep. 15, 2017.

Ceng, M. Smalley et al.; Videqual—A tool for quantitive meansurement of fixed CCTV Surveillance Systems; Presented and Published at the International Carnahan Conference on Security Technology 1996; 0-7803-3537-6-9/06; 1996 IEEE.

Kanayama, Kenji et al.; Development of Vehicle-License Number Recognition System Using Real-Time Image Processing and Its Application to Travel-Time Measurement; CH2944-7/91/0000/0798; 1991 IEEE.

Kwasnicka, Halina and Wawrzyniak, Bartosz; License Plate Localization and Recognition in Camera Pictures; AI-Meth 2002—Artificial Intelligence Methods; Gliwice, Poland, Nov. 13-15, 2002.

Appian Technology PLC; Talon—Description and Technical Specification—Automatic Number Plate Recognition System; Copyright 2003.

Hoffman, Alwyn Jakobus and Albertus J. Pretorius: "SmartRoad; A new approach to law enforcement in dense traffic environments"; 2015 IEEE 18$^{th}$ International Conference on Intelligent Transportation Systems. IEEE, 2015; Year 2015.

Foresti, Gian Luca et al. "Visual Sensor Technology for Advanced Surveillance Systems: Historical View, Technological Aspects and Research Activities in Italy", Department of Mathematics and Computer Science University of Udine, via delle Scienze, 206, 33100 Udine, Italy, Sensors ISSN 1424-8220; 19 Pages (2252-2270); Year 2009.

Panganiban, Edward B. et al.; "RFID-Based Vehicle Monitoring System"; 2017 IEEE 9$^{th}$ International Conference on Humanoid, Nanotechnology, Information Technology Communication and Control, Environmental Management (HNICEM); IEEE, Dec. 1-3, 2017; pp. 1-6; Year 2017.

Hu, Weiming, et al.; "A Survey on Visual Surveillance of Object Motion and Behaviors"; IEEE Transactions on Systems, Man, and Cybernetics, Part C: Applications and Reviews, vol. 34, No. 3, Aug. 2004; pp. 334-352; Year 2004.

* cited by examiner

| 302 | 304 | 306 | 308 | 310 | 312 | 314 | | 316 |
|---|---|---|---|---|---|---|---|---|
| | | UTC-04:00 | | | | | | |
| | | 10/13/2021 4:10:10 PM UTC-04:00 | 493KZ[8B] | ⊙ | BREWSTER CROWN VIC | LEFT CAMERA | MOBILES | |
| | | 10/13/2021 4:10:09 PM UTC-04:00 | 330C 4DE2 6110 02C0 0015 7086 | ⊙ | BREWSTER CROWN VIC | BREWVIC_RFID | MOBILES | 6 SPACE 7086 |
| | | 10/13/2021 4:10:07 PM UTC-04:00 | 195HXL | ⊙ | BREWSTER CROWN VIC | LEFT CAMERA | MOBILES | |
| | | 10/13/2021 4:10:06 PM UTC-04:00 | 330C 4DE2 6110 0300 0013 0551 | ⊙ | BREWSTER CROWN VIC | BREWVIC_RFID | MOBILES | 5 SPACE 0551 |
| | | 10/13/2021 4:10:05 PM UTC-04:00 | KNA756 | ⊙ | BREWSTER CROWN VIC | LEFT CAMERA | MOBILES | |
| | | 10/13/2021 4:10:04 PM UTC-04:00 | 330C 4DE2 6110 0340 0012 4140 | ⊙ | BREWSTER CROWN VIC | BREWVIC_RFID | MOBILES | 4 SPACE 4140 |
| | | 10/13/2021 4:10:01 PM UTC-04:00 | T73[OQ]3... | ⊙ | BREWSTER CROWN VIC | LEFT CAMERA | MOBILES | |
| | | 10/13/2021 4:10:00 PM UTC-04:00 | 0000 0000 0000 0000 0047 4006 | ⊙ | BREWSTER CROWN VIC | BREWVIC_RFID | MOBILES | 3 SPACE 4006 |
| | | 10/13/2021 4:09:59 PM UTC-04:00 | 621LKT | ⊙ | BREWSTER CROWN VIC | LEFT CAMERA | MOBILES | |
| | | 10/13/2021 4:09:58 PM UTC-04:00 | 621LKI | ⊙ | BREWSTER CROWN VIC | LEFT CAMERA | MOBILES | |
| | | 10/13/2021 4:09:57 PM UTC-04:00 | 330C 4DE2 6110 0340 0012 4877 | ⊙ | BREWSTER CROWN VIC | BREWVIC_RFID | MOBILES | 2 SPACE 4877 |
| | | 10/13/2021 4:09:55 PM UTC-04:00 | MLB8] [OO]23 | ⊙ | BREWSTER CROWN VIC | LEFT CAMERA | MOBILES | |
| | | 10/13/2021 4:09:54 PM UTC-04:00 | 330C 4DE2 6110 0300 0012 4166 | ⊙ | BREWSTER CROWN VIC | BREWVIC_RFID | MOBILES | 1 SPACE 4166 |

SYSTEMS AND METHODS FOR PARKING MANAGEMENT

The present Patent Application claims the benefit of U.S. Provisional Application No. 63/302,244, filed Jan. 24, 2022, titled "SYSTEMS AND METHODS FOR PARKING MANAGEMENT".

INCORPORATION BY REFERENCE

The disclosures made in U.S. Provisional Application No. 63/302,244, filed Jan. 24, 2022, are specifically incorporated by reference herein as if set forth in its entirety.

TECHNICAL FIELD

The present disclosure is directed to parking management systems and methods, and more specifically, to parking management systems and methods that facilitate vehicle management for parking spots or parking lots. Other aspects also are described.

BACKGROUND

Currently, management of parking lots, garages, etc. generally relies upon either manual monitoring or the use of a combination of a global positioning system (GPS) and license plate readers (LPR). Manual monitoring may include a person driving through a parking garage or lot and manually writing each license plate number for cross-reference against a list of permitted license numbers. In such situations, the list of license plate numbers may or may not be out of date. GPS integrated LPR systems do not require such a manual operation, and can locate the data-collecting vehicle to within 1-4 meters. However, these systems generally rely on line-of-sight to the sky for satellite information. Further, the GPS data typically does not track of height such that a GPS equipped LPR vehicle generating GPS tagged reads in a parking garage or urban canyon often cannot reliably identify the location of a vehicle down to a single parking spot, and further often cannot determine the floor on which the read took place. As such, parking garages containing multiple floors may result in 'overlapping' reads in the two dimensions the GPS data is able to map. The GPS also reports the location of the GPS receiver and not the target vehicle, potentially increasing the range of error when interpreting the value for a specific license plate in the view of a camera when the camera and target are both within a consistent distance from the GPS antenna It can be seen that a need exists for parking management systems and methods that facilitate vehicle management for parking spots or parking lots, in particular parking management in multi-level parking garages or structures.

The present disclosure is directed to the foregoing and other related, and unrelated, problems in the relevant art.

SUMMARY

Briefly described, the present disclosure is directed to systems and methods for parking management. In some aspects, the present disclosure is directed to systems and methods for collecting a license plate number from a vehicle, collecting additional data for a corresponding parking spot or lot from an identifying device or tag, which in embodiments can comprise a radio-frequency identification (RFID) tag, and determining a location of a vehicle or target and other information such as whether a vehicle associated with a read license plate is authorized to park in a particular spot or location within a parking facility.

Such systems and methods may include identifying devices or tags that can be positioned at or adjacent an associated parking spot or area. In a non-limiting example, and in embodiments such as disclosed herein, such identifying devices or tags (hereinafter generally referred to as "tags") can comprise RFID tags applied to or embedded in the floor of the parking facility such as a lot, garage, etc. on a pole proximate to the parking spot or location, or in the ceiling opposite the floor of parking spot or location or combination thereof. Parking management vehicles (e.g. vehicles configure to or otherwise provided for monitoring the parking facility) may include an LPR and a RFID reader. As the parking management vehicle travels through a parking facility, the parking management vehicle may read each license plate of vehicles parked in the parking facility. The parking management vehicle will read vehicle license plates and also may read a RFID tag corresponding to the parking spot that the vehicle is parked in. The license plate reads and/or RFID reads may be performed manually or automatically. In other words, a user may initiate a license plate read and/or a RFID read or, as a parking management vehicle passes by a parked vehicle, the parking management vehicle can automatically scan the parked vehicles license plate followed by scanning the corresponding RFID tag. In an embodiment, the RFID reader and/or LPR may be removably attached at a selected location on a particular level of the parking garage (e.g., the ceiling).

According to one aspect, a parking management system may include one or more tags. Each of the one or more tags may be positioned proximate to one or more parking areas, parking spots, a level of a parking garage, or some other parking area. In embodiments, each of the one or more tags may comprise a RFID tag or strip or other device configured to store and transmit data. The data may include information including, but not limited to a unique ID, location identifier specific to the tag, a list of one or more authorized vehicles (e.g., vehicles authorized to park in a selected area or parking spot), etc. . . . In an embodiment, the RFID tag may be located proximate to, nearby, or at the parking area; for example, a particular or selected parking spot may be associated with one or more authorized vehicles, and can have an RFID tag applied along or proximate the parking spot, such as embedded or attached to the floor, a wall, ceiling (e.g., via a surface mount, wireline, cable, or other ceiling attachment), or a post at the parking spot.

Each of the one or more tags, as noted, may be a RFID tag (or other tag or device). An RFID tag may include an antenna and an integrated circuit. The antenna may be configured to receive and transfer requests and/or data. The integrated circuit may be configured to store an amount of data, such as data identifying authorized vehicles at selected locations. The RFID tags also may include additional components, such as a power source, additional memory or storage, or some other component. In another embodiment, the RFID tag may be an active or a passive RFID tag.

The parking management system may include a license plate reader (LPR) and a tag reader. In embodiments, the license plate reader and/or tag reader may be included in a parking management vehicle and/or at a stationary location proximate the parking area. The license plate reader may be an automatic LPR (ALPR). The license plate reader may automatically scan or search for new license plates to remember. In another embodiment, the LPR may scan for a new license plate in response to a request to scan for a license plate, where requests may be from a user and/or from other device or components.

The parking management system will include a tag reader, e.g. a RFID reader. As other types of tags are utilized, the tag reader may be configured to read and/or request data from such other types of tags, or perform other addition tasks. For example, an active RFID tag may include a power source and when data is sent to or requested from the RFID tag, the power source may provide a selected amount of power sufficient to transfer the data. In another embodiment or aspect, the RFID tag may be a passive tag that is energized and/or receives power via a signal from the RFID reader. In an embodiment, the tag reader may request data from the tag. The data generally will include a location identifier (e.g. a number or alphanumeric identifier that uniquely identifies the location in which the tag was placed), and also may include additional information such as a list of authorized vehicles (e.g., authorized license plate numbers for a selected parking area), a list of unauthorized vehicles (e.g., particular vehicles not able to park in the parking area), and/or other relevant data. The data may be stored in the integrated circuit of the tag. The data stored in the tag can be modified as needed.

In embodiments, the RFID reader also may be configured to change or update the data stored in any of the one or more tags. For example, in some embodiments, the RFID reader may include programing to enable GPS location changes as the reader moves between different areas or even different parking lots; and in some embodiments can updated with date lists of authorized vehicles or license plates. Further, in such examples, the RFID reader may transmit, to one or more tags, a signal. The signal may include an updated list of authorized license plates (e.g., new and/or removed license plate numbers). The signal may indicate that the tag is to store the new updated list of authorized vehicles.

In some embodiments, the parking management system may include one or more monitor stations. The monitor stations may include one or more computing devices, such as laptops, desktops, servers, controllers, and/or any device capable of executing instructions similar to those disclosed herein. The one or more monitor stations also may further include a display to display relevant data from the components of the parking management system. Such information or data may be displayed via a graphical user interface (GUI), a web user interface (WUI), and/or other type of user interface. The monitor stations further may connect to input/output devices, such as a keyboard, the devices configured to allow a user to input data or search a particular set of data points.

In an embodiment, the one or more monitor stations may be in signal communication with the devices included in a parking management vehicle. The parking management vehicle may transmit plate read data to the one or more monitor stations, for the one or more monitor stations to determine, based on received data, whether a particular vehicle is an authorized vehicle. In another embodiment or aspect, such a determination may occur at the parking management vehicle in real-time. e.g., soon after a license plate read and tag read is performed.

In an embodiment, the parking management system may include one or more tags, such as RFID tags. The one or more tags may be disposed or positioned throughout a parking area. For example, each of the one or more tags may be placed or embedded proximate or near each parking spot of a parking facility, such as in front of a spot at each level of a parking area or parking garage, at specific intervals or sections of the parking area or parking garage, and/or on a post or pole or other fixed location nearby or proximate to a selected location at the parking area. The RFID tags contain a location identifier (a number or alphanumeric identifier that uniquely identifies the location in which the tag was placed, e.g. an identifier for a specific parking spot, which also can enable a monitoring system to dynamically compare known information about that spot and with a corresponding LPR read and with plates that are allowed or not allowed to park in that specific spot.

Another aspect of the disclosure is directed to a system for management of a parking facility. The system may include one or more tags positioned at selected locations within the parking facility. Each of the one or more tags may comprise an antenna configured to transmit data associated with one or more parking areas in response to a prompt and a memory configured to store the data associated with one or more parking areas. The system may include a license plate reader configured to detect and read license plate information. The system may include a tag reader. The tag reader may be configured to, in response to a license plate read by the license plate reader transmit a prompt to a corresponding tag of the one or more tags and receive the tag data associated with one or more parking areas.

In embodiments, the system may include one or more monitoring stations. The system may include communications circuitry configured to transmit read license plate numbers and data received from the tags associated with the associated one or parking areas corresponding to one or more of the read license plate numbers to the one or more monitoring stations. The one or more monitoring stations may comprise at least one processor configured to determine whether a vehicle identified by a read license plate number is permitted to be in a parking area associated with the corresponding tag data therefor.

In some embodiments, the license plate reader may comprise a camera configured to capture at least one image of a license plate, and a processor configured to execute instructions for performing optical character recognition on the at least one image to identify characters therein to generate a license plate read for identifying a vehicle associated with the read license plate information.

In embodiments, the license plate reader and tag reader may be positioned on a parking management vehicle.

In embodiments, each of the one or more tags may correspond to one or more of an individual parking spot in the parking area or a level of the parking area. Each of the one or more tags may be embedded, fixed, or attached in or to one of a floor, ceiling, or wall of the parking area.

In another embodiment, the system may include at least one monitoring station having a memory and a processor. The memory may be configured to store a location of each of a plurality of vehicles identified by an associated license plate number and tag data associated with an identified parking area corresponding to an identified vehicle and the processor may include programming configured to provide a visual report of a selected vehicle location upon a request therefor An aspect may include methods to utilize such a system. Such an aspect may include a method to manage a parking facility. The method may include scanning, via a license plate reader (LPR), for license plates. Such scanning may be done continuously, substantially continuously, periodically, or in response to a prompt given by a user at other specified or selected time intervals or periods. The scanning may occur automatically (e.g., without user input). In another embodiment, the scanning may begin upon prompt by a user, upon movement of the parking management vehicle, and/or upon some other event occurring at the parking area.

In an embodiment, the method may include, in response an LPR read of a license plate in an identified or associated parking facility, storing the license plate read, e.g. including a plate number and an identifier associated with the corresponding parking area in memory. The memory may be included, along with a processor, within or on the parking management vehicle. Each license plate read may be stored in the memory. Further, an identifier may be generated corresponding to a particular parking spot that the vehicle with the read license plate number is parked at. In an embodiment, the identifier may be an arbitrary number. The stored license plate number and identifier may be utilized to determine whether a vehicle is authorized vehicle to park in that spot and/or the facility.

In an embodiment, the method may include scanning, via a RFID reader, a tag associated with the corresponding parking area. Such scanning may occur after a license plate read. The scanning may include detecting the tag and/or initiating communication with the tag. The scanning may further prompt transfer of data from the tag to the memory of the parking management vehicle. The transferred data may include a list of authorized vehicles or license plates for a particular or selected parking area of a facility (e.g., a parking spot, a level at a parking garage, and/or a selected portion of the parking facility) corresponding to the tag information.

In an embodiment, the method may include comparing a read license plate number or other identifying information to a list of authorized license plate numbers for corresponding specific parking area from the corresponding tag associated with that parking area. The method may include, in response to a mismatch between the license plate number and license plate numbers included in the list of authorized license plate numbers, generating an alert indicating an unauthorized vehicle is parked in the corresponding parking area.

Another aspect of the disclosure is directed to a method for management of a parking area. The method may include scanning for tags associated with selected locations within the parking area. The tags may comprise RFID tags positioned at each of the selected locations. The method may include receiving, with an RFID reader, at least one location identifier associated with each of the selected locations from the RFID tags. The method may include scanning for license plates of a plurality of vehicles within each of the selected locations of the parking area with a license plate reader. The method may include capturing one or more license plates associated with one or more of the plurality of vehicles within the parking area with the license plate reader. The method may include storing captured license plate numbers for each of the plurality of vehicles together with an associated location identifier for a corresponding one of the selected locations at which each license plate number is captured in a memory. The method may include comparing each captured license plate number and associated location identifier associated with the corresponding one of the selected locations to a list of authorized license plate numbers stored in a memory and associated with the corresponding one of the selected locations stored in the tag. The method may include determining whether each captured license plate number matches a license plate number in the list of authorized license plate numbers to verify a vehicle identified by each captured license plate number is authorized to park in the one or more parking areas. The method may include, in response to a mismatch between at least one captured license plate number and the license plate numbers included in the list of authorized license plate numbers stored in the tag, generating an alert indicating an unauthorized vehicle is present in the corresponding one of the locations.

In an embodiment, the method may include determining a number of occupied and empty parking spaces, floors, areas, or combinations thereof.

In another embodiment, the method may include generating a report of a location of a specific vehicle within the parking area upon request. The corresponding parking area may be located within a parking garage or lot. Generation of the report of the location of the specific vehicle within the parking area may comprise identifying a parking space, floor, or section of the parking garage or lot at which the specific vehicle is located. In an embodiment, determining whether each captured license plate number matches a license plate number in the list of authorized license plate numbers may be performed in substantially real-time.

In another embodiment, the method may include displaying at the monitoring station the corresponding one of the locations of the parking are where the unauthorized vehicle is located.

In another embodiment, the method may include capturing the one or more license plates associated with one or more of the plurality of vehicles within the parking area comprises capturing a photograph, video, image, or a combination thereof of each of the one or more license plates substantially simultaneously with receiving the associated location identifier associated with the corresponding one of the selected locations by the RFID.

In another embodiment, the method may include performing optical character recognition on each captured license plate and generating a license plate number prior to storing the license plate number.

Another aspect may be directed to a parking management system. The parking management system may include one or more license plate readers. Each of the one or more license plate readers may be configured to detect a license plate and capture a license plate number of a detected license. Each of the one or more license plate readers may generate a plate read of a captured license plate number associated with a vehicle. The parking management system may include a tag reader. The tag reader may be configured to, in response to a license plate read by the license plate reader, transmit a prompt to a corresponding tag of one or more tags and receive data associated with one or more parking areas. The tag reader may be configured to receive data associated with one or more parking areas and/or one or more non-parking areas. The parking management system may include a monitoring station. The monitoring station may be configured to receive captured license plate numbers from the one or more license plate readers, receive data associated with the one or more parking areas and/or one or more non-parking areas from the tag reader, and determine whether a vehicle corresponding to the captured license plate number is authorized to park in the one or more parking areas and/or one or more non-parking areas.

In another aspect, the parking management system may include at least one parking management vehicle. The at least one parking management vehicle may include the one or more license plate readers. Further, the at least one parking management vehicle may include the monitoring station. Further still, determinations of whether a vehicle is authorized to park in the one or more parking areas and/or one or more non-parking areas may be performed substantially in real-time. The monitoring station may be configured to display determinations of whether the vehicle is authorized to park in the one or more parking areas. In an aspect, as the at least one parking vehicle moves about a parking structure, the one or more license plate readers are moved in proximity to each vehicle sufficient to detect and capture the at least one image of the license plate of the vehicle.

In another aspect, the tag reader may comprise one of a mobile tag reader or a stationary tag reader. In yet another aspect, each of the one or more license plate readers may comprise one of a mobile license plate reader or stationary license plate reader.

Various objects, features, and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. No attempt is made to show structural details of this disclosure in more detail than may be necessary for a fundamental understanding of the exemplary embodiments discussed herein and various embodiments in which they may be practiced. While the description is focused on specific implementations and embodiments of the teachings, and is provided to assist in describing the teachings, this focus should not be interpreted as a limitation on the scope or applicability of the teachings disclosed herein.

In embodiments, the present disclosure is directed to parking management systems and methods. Such systems and methods may include real-time management of parking facilities utilizing frequently updated data regarding vehicles authorized in a facility and/or selected parking areas and/or parking locations or spots within the facility. Such systems and methods may include one or more tags embedded and/or positioned at various locations or points within the parking facility. A parking management vehicle or device may include a license plate reader (LPR) configured to read license plate numbers and a tag reader to read data stored in the tags. Further, such a parking management vehicle or device may be configured to update data stored in each of the one or more tags, e.g. updated a list of authorized vehicles.

For example, the parking management systems and methods described herein are utilized for determining whether a vehicle parked in a selected parking area is authorized to reside or be parked in the selected parking area of a parking facility. Further, such determinations may be made at the point of the license plate read and the tag scan, rather than gathering data and performing such determinations at another site. Finally, based on the type of tag utilized, a user may be able to determine or locate where their vehicle is parked, either via scanning and tracking by a parking management vehicle or by scanning via a user's device (e.g., a near field communication (NFC) enabled smartphone or other device).

Accordingly, the system of the present disclosure provides an integrated enforcement system for management and monitoring of parking facilities that, by incorporating tags, such as RFID or other data transmitting tags, placed in or near each parking space and/or in strategic locations in the garage or parking area, together with LPR readers, enables more precise enforcement of parking payment by location, space type and/or plate allowing integration with a number of means of payment and payment tracking that include pay-by-space and pay-by-plate schemes, and other features, such as providing enhanced monitoring and management of zones of enforcement within the parking area at the individual space level. A mobile tag reader can determine the precise location of the tag and surrounding LPR reads with precision. Location of the tags and antenna on the mobile reader can be planned using methods that allow tight coordination of tag reading location and LPR read zone by identified or corresponding space. This allows the system, for example to identify whether a specific vehicle is in a handicapped space, a loading zone, a paid spot or an unpaid location with accuracy.

In embodiments, the collected data can also identify the number of spaces occupied and empty in specific floors or areas by type (handicapped, monthly, hourly) with precision. Methods of data analysis can also determine trends in occupancy and market by space type. Space types can be changed without modification to the tag structure purely as a data-association action. Further, vehicle authorization information and changes thereto may be stored and updated per selected tag or sets of tags. For example, selected users may be authorized to park in locations identified by a set of tags (e.g., defined by a floor, floors, a specified garage, selected parking spots or locations, etc.). As users authorized for the sets of tags change or are updated, or if the number of parking spots or the area in which such authorized users expand or otherwise change, the data stored in those associated sets of tags may be updated.

In some embodiments, tags also can be placed at non-space locations to trigger logic in the mobile reader software system such that the location of the reader-vehicle can be used to modify software behavior and to alert the operator of changes in operational mode. For example, the mobile reader software system can include logic or programming that enables an operator to receive an alert as to, for example, a vehicle parked in such a non-space location, and if such vehicle is at least temporarily authorized to use such a non-space location, such as for a delivery or pickup, emergency use, etc., the mobile reader software system can be updated to identify and recognize such temporary uses.

The integrated enforcement system also allows for the location of substantially any vehicle within a parking structure and for any vehicle to be reported and/or identified easily by plate and space number, even in a large, multi-level parking garage. Such a mobile collection system can patrol the parking structure and provide a data resource allowing customers to look up the location of their vehicle if the space or floor is forgotten by the operator, saving significant customer and employee time searching for 'lost' vehicles. Collection and enforcement processes are also streamlined and reinforced by retaining precise records of the location of a vehicle throughout a charged parking period rather than just at entry and exit as in current schemes.

The tags of the integrated enforcement system, in embodiments, include RFID tags having short range radio communication to energize and receive short identifying data strings from small 'tags'. The use of such passive tags powered by the incoming radio energy means that the tag does not need a battery and can communicate indefinitely. The short-range nature of the tags makes them suitable for near-contact to 20-meter identification regardless of light, orientation and surface condition. RFID tags are very inexpensive. A variety of tags exist for specific purposes from retail item tracking to rugged, pavement-embedded tags.

LPR, as used herein, generally refers to the use of cameras to capture images of Vehicle License Plates and perform Optical Character Recognition on the resulting images to allow computer software to identify and communicate the license plate information of a vehicle in the field, e.g., to recognize and identify alphanumeric characters or symbols, or other, similar identifying information from such plate images. LPR cameras can be mounted on fixed or mobile platforms. Mobile LPR allows equipped vehicles to move through roadways and parking areas collecting the license plate information of every vehicle that come within a selected range, e.g. 5-40 feet, of an LPR reader. The LPR systems can use wireless communications to send the data to a central server. LPR range, field of view and camera location can be modified to serve specific collection applications.

Figure 1A:
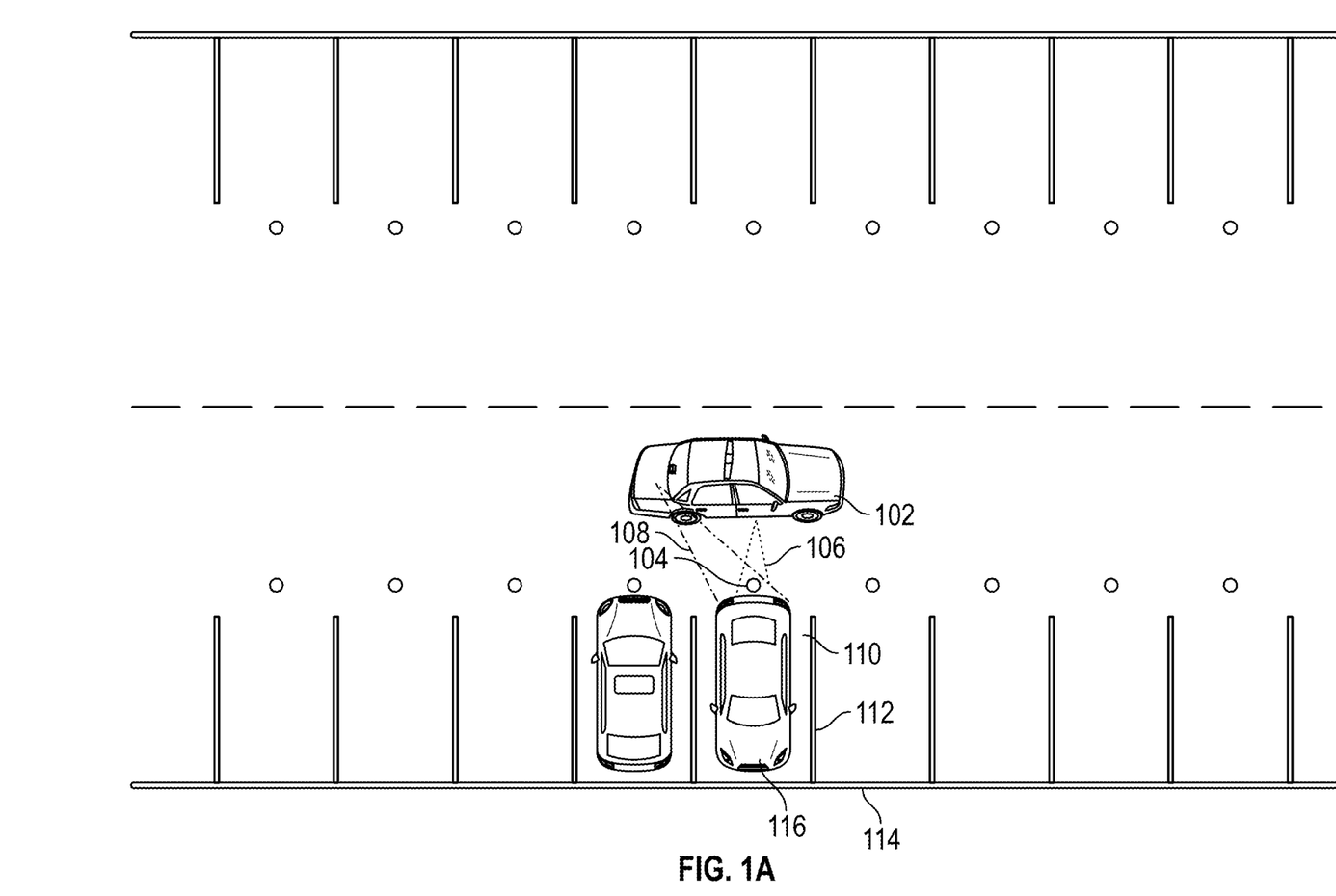
FIGS. 1A and 1B are schematic diagrams of a parking management system according to the present disclosure.
Figure 1B:
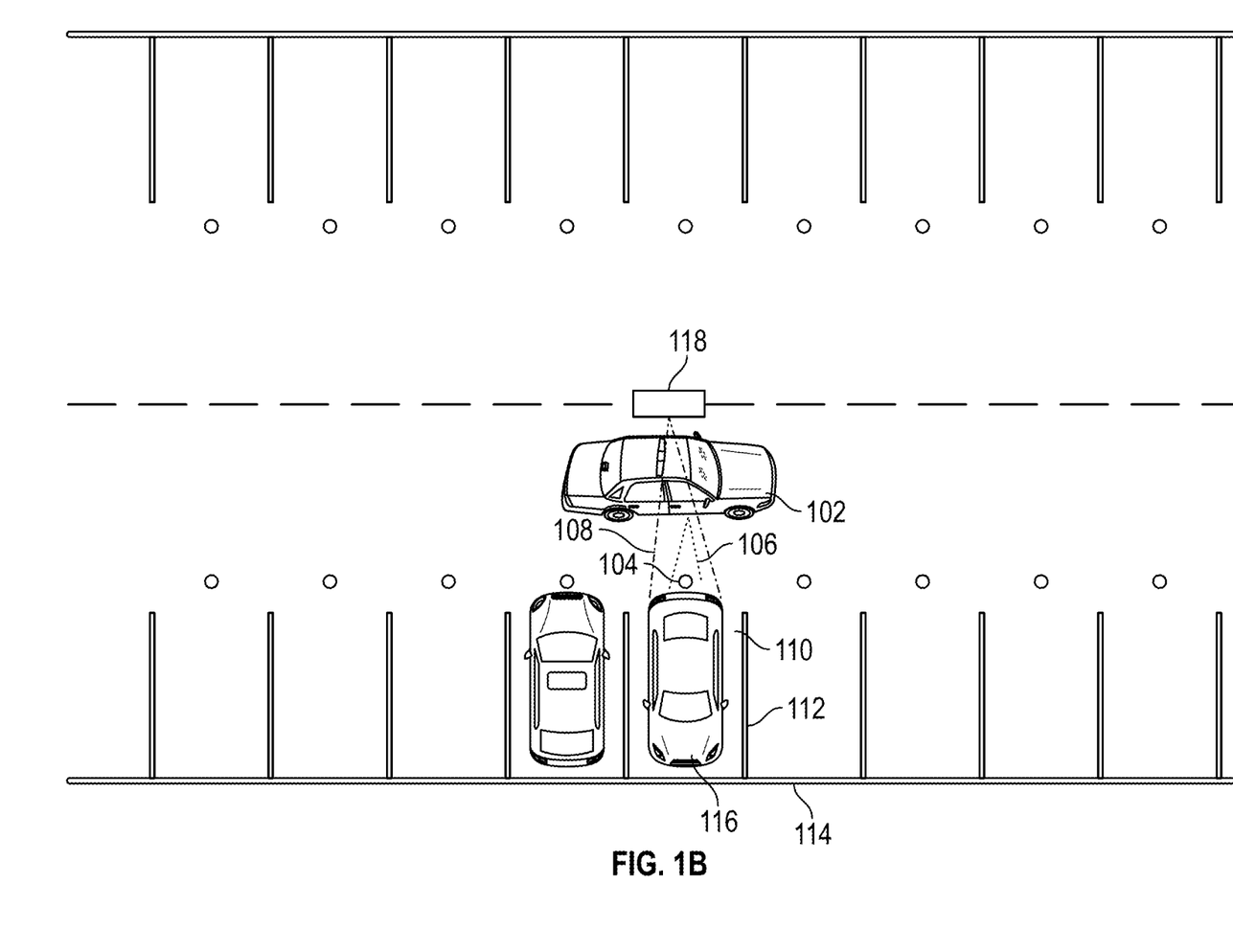

FIGS. 1A and 1B are a schematic diagrams of a parking management system according to the present disclosure. The parking management system may include one or more identifying devices or tags 104, such as, in one non-limiting example, RFID tags, positioned at selected locations within a parking facility at each of one or more parking spots 110. Each of the parking spots 110 may be defined by painted dividers 112 or other structures and a wall 114, parking block, or another painted divider. Vehicles (e.g., vehicle 116) may park in one of the parking spots 110. Such parking spots 110 may be included in or a part of a parking garage (e.g., a structure including two or more levels) or a parking area. The tags 104/RFID tags generally can contain a location identifier, such as a number or alphanumeric identifier that uniquely identifies the location in which the tag was placed, which, in embodiments, could be a GUID or name for a specific parking spot. Such tag information can provide flexibility so that a back end monitoring or control system can identify the parking spot location, check (dynamically) what is known about that spot and then compare to the corresponding LPR read with plates allowed or not allowed to park in that specific spot.

The parking facility or area may include parking spots 110, parking levels, and/or parking areas designated for authorized vehicles. A list of authorized vehicles may be updated frequently (e.g., daily, weekly, or monthly) due to drivers requesting or cancelling parking. Further, such requests can be for a specified period of time, with a potential for renewal or cancellation. As such, data for each of the parking spots 110, parking level, or other parking area may update frequently. Such updated data may be transmitted, via a tag or RFID tag reader positioned on a parking management vehicle 102. to the tag 104 or RFID tag.

As noted, the parking management system may include a parking management vehicle 102. The parking management vehicle 102 may include a user operated vehicle, a security or law enforcement vehicle, an autonomous vehicle, a small and/or compact drone, and/or other vehicle configured to scan license plates and/or tags or RFID tags. As depicted in FIG. 1A, the parking management vehicle 102 may include a license plate reader (LPR) or LPR camera configured to record or capture an image of a license plate (e.g., see 108). The parking management vehicle may further include a tag or RFID tag reader to scan and obtain data stored in a tag 104, as well as to update data stored in the tag 104 (e.g., see 106). As depicted in FIG. 1B, the parking management vehicle 102 may include the tag or RFID tag reader.

In addition, or alternatively, the parking management system may include a stationary, fixed, or removably attached camera, LPR, and/or LPR camera or a plurality of such components. In such examples, the stationary LPR 118 may scan or capture images of each vehicle's 116 license plate. In an embodiment, the parking management vehicle 102 and/or the stationary LPR 118 may include a plurality of LPRs, LPR cameras, and/or cameras positioned at varying locations thereon (e.g., a rear camera, left camera, right camera, front camera, etc.).

In an embodiment, rather than including a tag 104 or RFID tag per each parking spot 110, the parking management system may include one tag or RFID tag per floor or level of a parking garage, which tag can include a location identifier, e.g. a number or alphanumeric identifier that can uniquely identify the location or level in which the tag was placed, which could be a GUID or name for a specific parking spot. In another embodiment, each level or parking area may include different sections of parking spots with different authorizations. In such examples, each section may include a tag or RFID tag. In such cases where an RFID tag is placed to identify a floor, section or elevation within a garage, a GPS device may or may not be used in tandem to allow coordinated recording of floor and location on that floor, for example.

As noted, the tag may be an RFID tag. The RFID reader of the parking management vehicle or other device or location may be configured to detect RFID signals from the RFID enabled tags or devices. The RFID enabled tags or devices can include passive or active RFID tags or devices. Such RFID enabled tags or devices may operate at varying frequencies, such as 125 KHz, 134 KHz, 13.56 MHz, 433 MHz, 806 MHz to 956 MHz, 2.45 GHz, or 5.6 GHz. The RFID reader 218 may read RFID signals within about 1 foot to about 20 feet, within 1 foot to about 15 feet, within about 1 foot to 10 feet, within about 1 foot to about 5 feet, or other ranges.

Figure 2A:
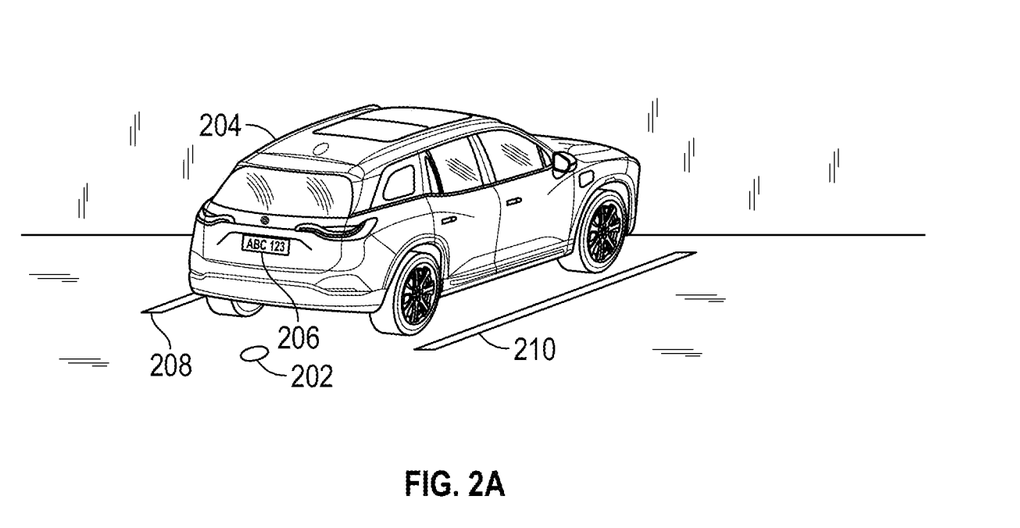
FIGS. 2A and 2B are schematic diagrams of a parking management system according to the present disclosure.
Figure 2B:
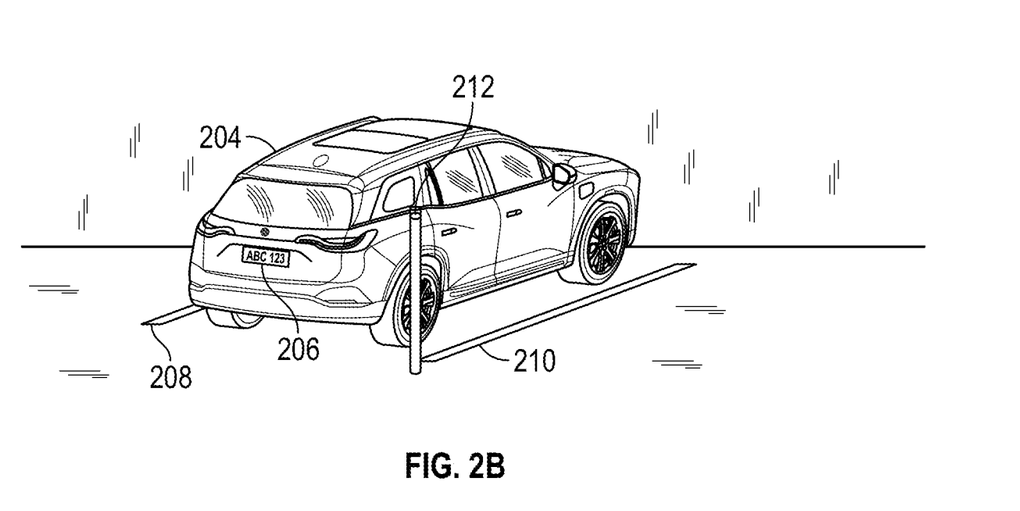

In another embodiment, the parking management system may include a RFID range extender or repeater. In such embodiments, the range of RFID reads may be increased to up to about 100 feet or up to about 200 feet. In another embodiment, if ultra-high frequency RFID tags (UHF RFID) are present, read ranges can be increased to about 75 feet-100 feet with the directional antenna configuration. In an embodiment, if an RFID signal of a particular component, tag, or device is detected and read, the resulting data may include, but not be limited to, a location of the component or device, a serial number of the component or device, a manufacturer, a photo (e.g., a photo of the location that the device is positioned at), a use history, a maintenance schedule, and/or other identifying information. In some embodiments, a list of authorized vehicle license plate numbers, and/or other data also can be stored in the RFID tag or RFID enabled device FIGS. 2A and 2B schematically illustrate a parking spot, wherein the parking spot may be defined by painted strips or lines, e.g., such as strip 208 and strip 210, at which a tag 202 or RFID tag is positioned and associated therewith. A vehicle 204 may park between such strips 208, 210. Each parking spot may include a tag 202. The tag 202 may be embedded or positioned in the floor proximate to or nearby the parking spot. In another embodiment, a pole, rod, or other similar structure may be positioned nearby or proximate to one of the strips 208, 210. In such examples, the tag 212 may be positioned thereon. As such, the parking management vehicle may read the license plate of the vehicle 206, as well as the tag (for example, tag 202 or tag 212).

In another embodiment, other types of tags may be utilized. For example, a Wi-Fi and/or Bluetooth® enabled tag or other type of tag to receive and transmit data via wireless signal communication. The tag may include data related to a particular parking spot, such as the GPS location, a parking level, spot identifier or other number or alphanumeric identifier that uniquely identifies the location in which the tag was placed. In some embodiments, the tag also could include a list of authorized vehicle's license plates. In yet another embodiment, the tag may be positioned at, nearby, or proximate to the wall of the parking area. The tag may also be embedded in or positioned at some point on a structure positioned on the ceiling of the parking area.

In an embodiment, the tag may be embedded in a surface of the parking area. The tag may be fixed or may be removable attached to the surface. In such examples, the tag may be removed at a particular time for repair, replacement, and/or some other purpose. In an embodiment, when the tag is embedded at or proximate a parking spot, the tag may be covered in a material sufficient to withstand the force of a vehicle traveling over the tag. Such a material may allow for the wireless signals to pass between the tag and the tag reader.

Figure 3:
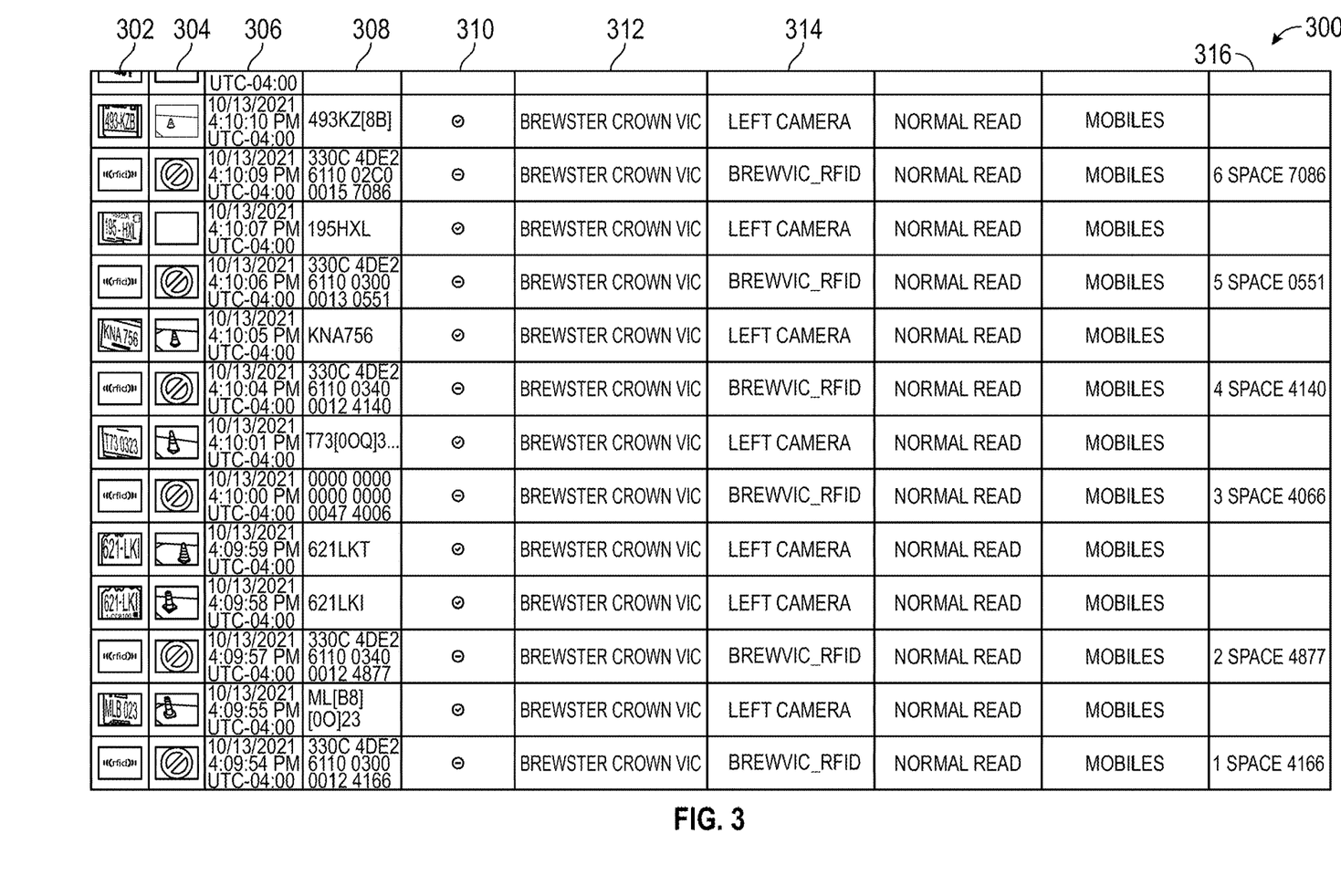
FIG. 3 shows an exemplary screen shot of an interface associated with the parking management system according to FIG. 1 and/or FIG. 2.

FIG. 3 shows an exemplary screen shot of an interface associated with the parking management system according to FIG. 1 and/or FIG. 2. The parking management system may generate a GUI or web based user interface 300. For each read, either of a license plate or tag, a line or row of data may be generated. For example, as depicted in column 302 of FIG. 3, the GUI may include the type of read, as well as an included image. Further, additional images, as depicted in column 304, may be captured and displayed.

Further, the GUI may include other data points, including, but not limited to, a time of the read (e.g., see column 306), a unique series of numbers and/or numbers (e.g., to be used as an identifier, see column 308. A successful read may also be displayed (e.g., see column 310). If an image is not successfully captured, the parking management vehicle may capture another image.

The GUI may also include a make and model of the vehicle, if available (e.g., see column 312). The GUI may also include which camera capture the image or tag read (e.g., see column 314). Finally, the GUI may include information regarding the parking spot of a vehicle (e.g., a number, descriptive name, and/or other unique identifier, see 316). Such a GUI may be available within a computing device of the parking management vehicle. In another example, the GUI may be available in one or more monitoring stations. In such embodiments, the data provided by the parking management system may be transmitted from a parking management vehicle to one or more of the monitoring stations for further analysis.

In an embodiment, the monitoring stations may be or may include a computing device. A computing device may include any one or all of programmable logic controllers (PLCs), programmable automation controllers (PACs), industrial computers, desktop computers, workstations, personal data assistants (PDAs), laptop computers, tablet computers, smart-books, palm-top computers, personal computers, smartphones, wearable devices (e.g., headsets, smartwatches, or the like), a server (e.g., a rack server, blade server, cluster, etc.), and similar electronic devices equipped with at least a processor and any other physical components necessary to perform the various operations described herein. The monitoring station may include a memory and at least one processor. The memory of the monitoring stations may store lists of authorized vehicles for one or more sections or areas. As any of the lists are updated (for example, via the GUI, at one of the monitoring stations, or via other components or devices), the monitoring stations may communicate (for example, wirelessly) those updates to tags, mobile tag readers, stationary tag readers, and/or other components and/or devices described herein.

Figure 4:
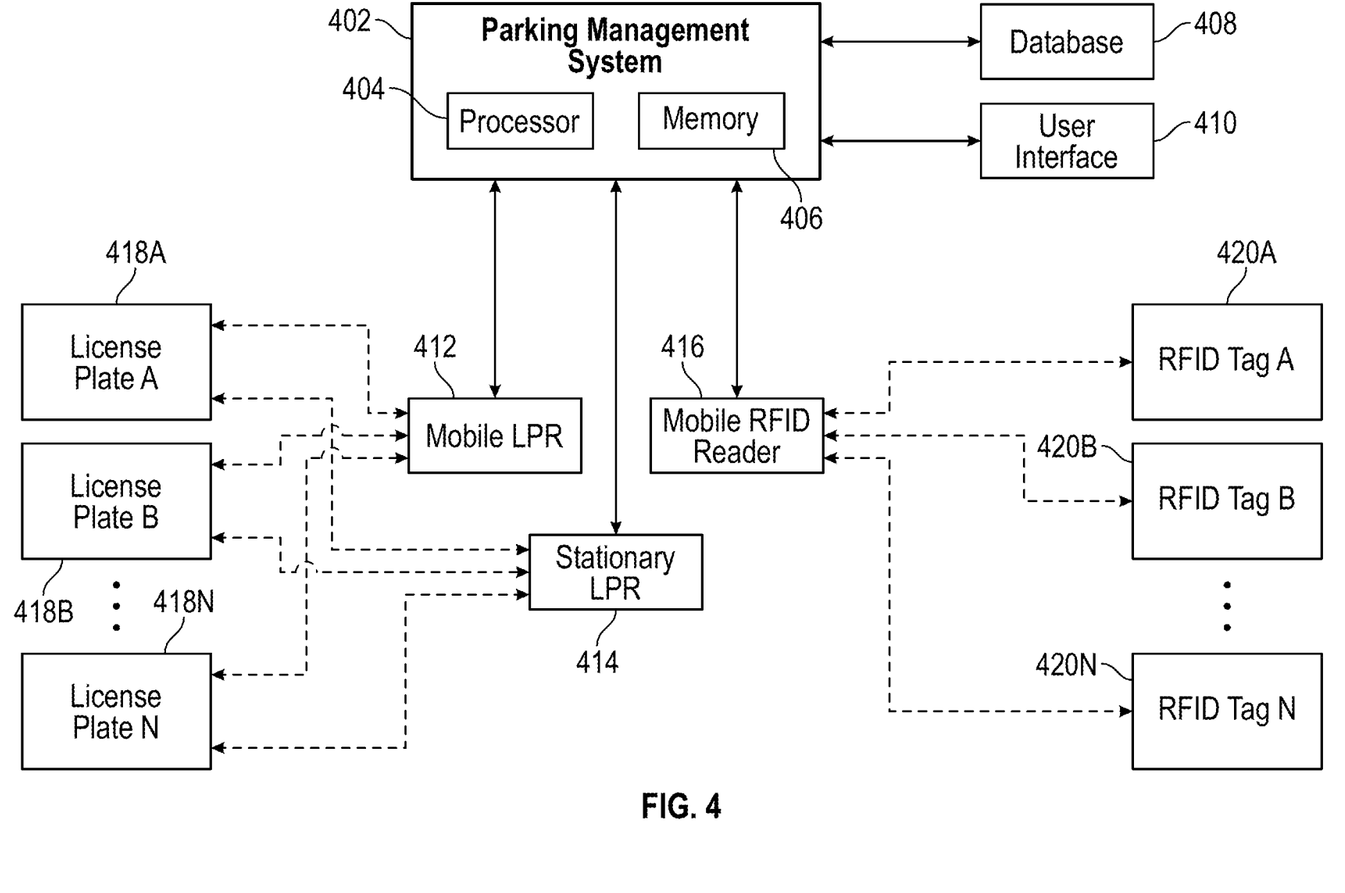
FIG. 4 is a schematic block diagram of a parking management system according to the present disclosure.

FIG. 4 is a schematic block diagram of a parking management system according to the present disclosure. As noted, parking management system 402 may include a processor 404 and a memory 406. The memory 406 may include instruction executable by the processor 404. In such embodiments, the parking management system 402 may receive various data points from the database 408 and/or user interface 410.

In an example, the memory 406 may be a non-transitory machine-readable storage medium. As used herein, a "machine-readable storage medium" may be any electronic, magnetic, optical, or other physical storage apparatus or cyber-physical separation storage to contain or store information such as executable instructions, data, and the like. For example, any machine-readable storage medium described herein may be any of random access memory (RAM), volatile memory, non-volatile memory, flash memory, a storage drive (e.g., hard drive), a solid-state drive, any type of storage disc, and the like, or a combination thereof. As noted, the memory 406 may store or include instructions executable by the processor 404. As used herein, a "processor" may include, for example, one processor or multiple processors included in a single device or distributed across multiple computing devices. The processor 404 may be at least one of a central processing unit (CPU), a semiconductor-based microprocessor, a graphics processing unit (GPU), a field-programmable gate array (FPGA) to retrieve and execute instructions, a real-time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements in signal communication.

The parking management system 402 may include or may connect to either a mobile LPR 412 or a stationary LPR 414. The parking management system 402 may gather or capture images from, for example, a license plate A 418A, license plate B 418B, and/or up to license plate N 418N. For example, the parking management system 402 may include instructions, that when executed, are configured to detect when a license plate (e.g., a license plate A 418A, license plate B 418B, and/or up to license plate N 418N) is present. Upon detection, the mobile LPR 412 or stationary LPR 414 may capture an image of the license plate (e.g., a license plate A 418A, license plate B 418B, and/or up to license plate N 418N).

Further the parking management system 402 may include or connect to a mobile RFID reader 416. In an embodiment, rather than a mobile RFID reader 416, a stationary RFID reader may be utilized. In either example, the mobile RFID reader 416 (and/or, in some embodiments, a stationary RFID reader) may read data from RFID tag A 420A, from RFID tag 420B, and/or up to RFID tag 420N.

Based on a license plate read or capture the parking management system 402 may determine, by comparing data read by the mobile RFID reader 416 (and/or a stationary RFID reader), one or more of whether a vehicle is authorized to park in a selected location or whether a selected time limit that a vehicle is permitted to park in a selected location has lapsed. The parking management system 402 may, in an embodiment, transmit a notification to a user indicating if a vehicle is unauthorized and/or a parking time has lapsed, or in embodiments, can including programing to record time intervals that a vehicle has been I the facility and/or has occupied a particular spot or area. In an embodiment, such an indication may be transmitted to one or more monitor stations.

In an embodiment, the parking management system 402 may be or may be included a parking management vehicle. In such embodiments, the determination that whether a vehicle is unauthorized may occur at the parking management vehicle in real-time, for example, soon after a license plate read and tag read is performed.

Such a parking management system 402 may be utilized to assist vehicle owners in locating a vehicle. For example, a search for the license plate read and RFID tag read may be performed via the GUI noted above. Such a search may include the last known parking spot of the vehicle. Further, a user may scan the RFID tag themselves, for example, with a NFC enabled smartphone or other device. Such a scan may store the parking spot number within the NFC enabled smartphone or other device. Such an example illustrates how a user may utilize the RFID tag to locate or keep track of a vehicle.

Figure 5:
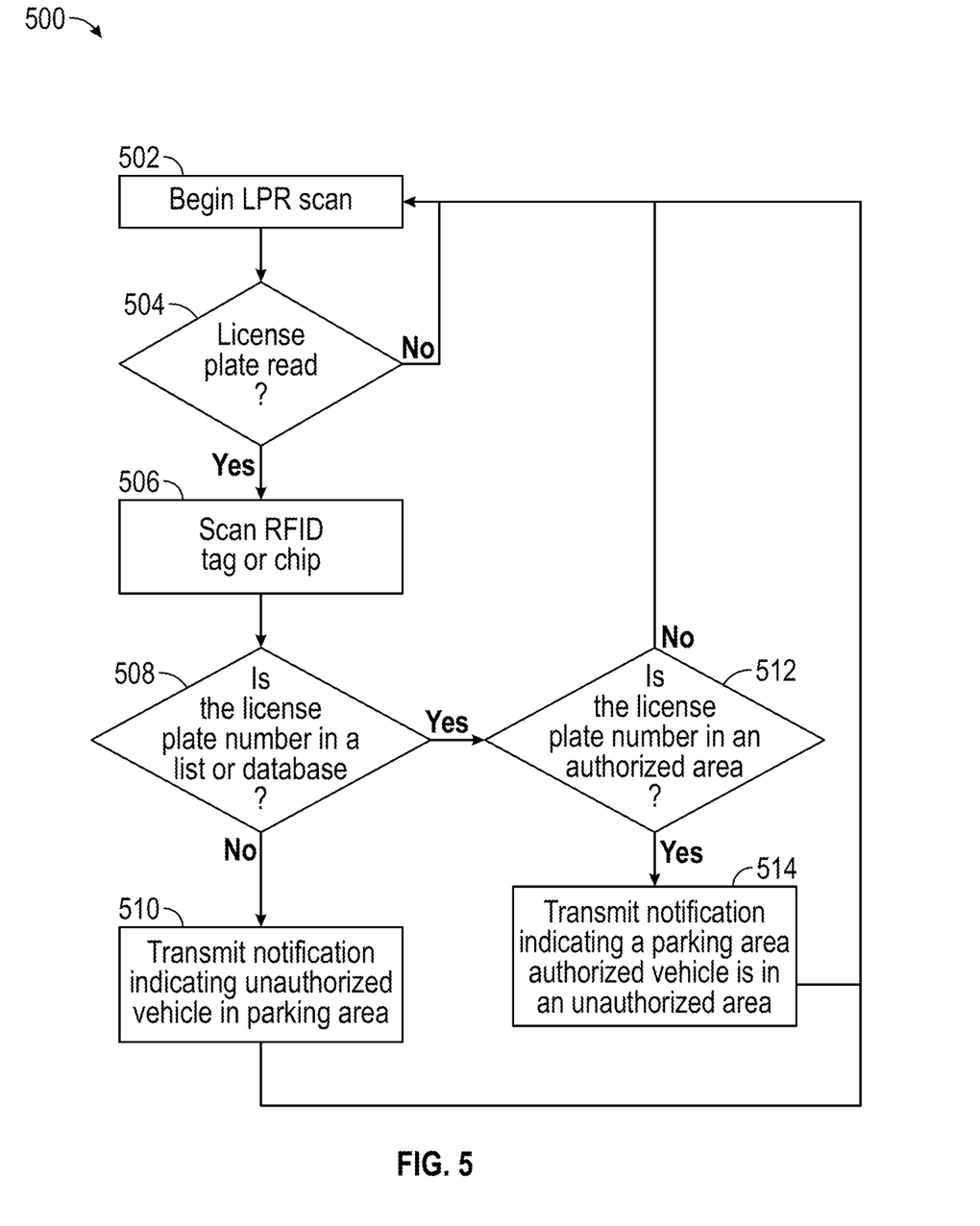
FIG. 5 is a flow chart of method for managing a parking area according to the present disclosure.

FIG. 5 shows a flow diagram, implemented in a signal processor or other computing device of the parking management system for performing parking management, according to an embodiment. The method is detailed with reference to the parking management system 402 of FIG. 4. Unless otherwise specified, the actions of method 500 may be completed within the parking management system 402. Specifically, method 500 may be included in one or more programs, protocols, or instructions loaded into the memory 406 of the parking management system 402 and executed on the processor 404 or one or more processors of the parking management system 402. The order in which the operations are described is not intended to be construed as a limitation, and any number of the described blocks may be combined in any order and/or in parallel to implement the methods.

At block 502, a parking management vehicle or stationary LPR may begin to scan for license plates. As the parking management vehicle passes by a vehicle, the LPR may capture an image. Such scans may occur automatically or upon a prompt or initiation by a user.

At block 504, the parking management system may determine whether a license plate has been read. The parking management system may ensure that a proper image has been captured to identify a vehicle. In another embodiment, in conjunction with capturing the license plate, the parking management system may capture one or more visual identifiers of a vehicle, including, but not limited to, stickers, damage, and/or other identifiers. If an image is not captured the method 500 may proceed back to scanning for a license plate at block 502.

At block 506, if a license plate is read, the method may move to the next step of scanning a RFID tag. At block 508, the parking management system 402 may compare the license plate number from the LPR read, to the number stored in a database or list, e.g. a hot list or authorized vehicle listing, together with the RFID tag location information. In some embodiments, such authorized vehicle information could be stored in the RFID tag. If the number is in the list, at block 512, the parking management system may check to ensure the vehicle is in a proper or authorized area. The RFID tag also can be scanned without a prompt from the LPR reader, e.g., to identify an open space in the parking garage or area, which can enable customers or parkers to be directed to open spaces quickly and to enable more effective management of the parking facility.

At block 510, if a vehicle or vehicle's license plate number is not in a list, the parking management system may transmit a notification or indication that an unauthorized vehicle is in a selected parking area. The notification may be transmitted directly to a parking management vehicle or a GUI at one or more monitoring stations. Such a notification may allow a user operating the parking management vehicle to take or execute an action. For example, the user can issue a parking ticket, tow the unauthorized vehicle, and/or perform another suitable action.

At block 514, if the vehicle is authorized, but in an unauthorized area, the parking management system may transmit a notification or indication that an authorized vehicle is in the wrong area (e.g., an unauthorized area). Such a notification may allow for a user to contact another user to move their vehicle or perform some other action.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

The invention claimed is:

1. A system for management of a parking facility comprising:

one or more tags positioned at selected locations within the parking facility, each of the one or more tags comprising:
an antenna configured to transmit data associated with one or more parking areas in response to a first prompt, and a memory configured to store the data associated with the one or more parking areas;
a license plate reader configured to detect and read license plate information; and
a tag reader configured to, in response to a license plate read by the license plate reader:
transmit a second prompt to a corresponding tag of the one or more tags, and
receive the tag data associated with the one or more parking areas.

2. The system of claim 1, further comprising one or more monitoring stations.

3. The system of claim 2, further comprising communications circuitry configured to transmit read license plate numbers and tag data received from the one or more tags associated with the associated one or parking areas corresponding to one or more of the read license plate numbers to the one or more monitoring stations.

4. The system of claim 3, wherein the one or more monitoring stations comprise at least one processor configured to determine whether a vehicle identified by a read license plate number is permitted to be in a parking area associated with the corresponding tag data therefor.

5. The system of claim 1, wherein the license plate reader comprises a camera configured to capture at least one image of a license plate, and a processor configured to execute instructions for performing optical character recognition on the at least one image to identify characters therein to generate a license plate read for identifying a vehicle associated with the read license plate information.

6. The system of claim 1, wherein the license plate reader and the tag reader are positioned on a parking management vehicle.

7. The system of claim 1, wherein each of the one or more tags comprises an RFID tag.

8. The system of claim 1, wherein each of the one or more tags correspond to one or more of an individual parking spot in a parking area or a level of the parking area.

9. The system of claim 7, wherein each of the one or more tags are embedded in one of a floor, ceiling, or wall of the parking area.

10. The system of claim 1, further comprising at least one monitoring station having a memory and a processor; wherein the memory is configured to store a location of each of a plurality of vehicles identified by an associated license plate number and tag data associated with an identified parking area corresponding to an identified vehicle; and wherein the processor includes programming configured to provide a visual report of a selected vehicle location upon a request therefor.

11. A parking management system comprising:
one or more license plate readers each configured to:
detect a license plate;
capture at least one image of the license plate; and
generate a license plate read of a captured license plate number associated with a vehicle;
a tag reader configured to, in response to the license plate read by the one or more license plate readers:
transmit a prompt to a corresponding tag of one or more tags, and
receive data associated with one or more parking areas; and
a monitoring station configured to:
receive a captured license plate number for each license plate of an associated vehicle read by the one or more license plate readers,
receive data associated with the one or more parking areas from the tag reader, and
determine whether a vehicle with the captured license plate number is authorized to park in the one or more parking areas.

12. The parking management system of claim 11, further comprising at least one parking management vehicle; wherein the at least one parking management vehicle includes the one or more license plate readers positioned thereon; and wherein as the at least one parking vehicle moves about a parking structure, the one or more license plate readers are moved in proximity to each vehicle sufficient to detect and capture the at least one image of the license plate of the vehicle.

13. The parking management system of claim 12, wherein the at least one parking management vehicle includes the monitoring station.

14. The parking management system of claim 13, wherein a determination of whether a vehicle is authorized to park in the one or more parking areas is performed in substantially real-time, and wherein the monitoring station is configured to display the determination of whether the vehicle is authorized to park in the one or more parking areas.

15. The parking management system of claim 11, wherein the tag reader comprises one of a mobile tag reader or a stationary tag reader.

16. The parking management system of claim 11, wherein each of the one or more license plate readers comprise one of a mobile license plate reader or stationary license plate reader.

17. A method for management of a parking area, the method comprising:
scanning for RFID tags associated with and positioned at selected locations within the parking area;
receiving, with an RFID reader, at least one location identifier associated with each of the selected locations from the RFID tags;
scanning for license plates of a plurality of vehicles within each of the selected locations of the parking area with a license plate reader;
capturing one or more license plates associated with one or more of the plurality of vehicles within the parking area with the license plate reader;
storing captured license plate numbers for each of the plurality of vehicles together with an associated location identifier for a corresponding one of the selected locations at which each of the license plate numbers is captured in a memory;
comparing each captured license plate number and associated location identifier associated with the corresponding one of the selected locations to a list of authorized license plate numbers stored in the memory and associated with the corresponding one of the selected locations stored in the RFID tags;
determining whether each captured license plate number matches a license plate number in the list of authorized license plate numbers to verify a vehicle identified by each captured license plate number is authorized to park in one or more selected locations within the parking areas; and
in response to a mismatch between at least one captured license plate number and the license plate numbers included in the list of authorized license plate numbers stored in the RFID tags, generating an alert indicating an unauthorized vehicle is present in the corresponding one of the locations.

18. The method of claim 17, wherein the license plate reader, the RFID reader, and the memory, are mounted on a parking management vehicle.

19. The method of claim 18, wherein the memory is in communication with one or more monitoring stations, and further comprising wirelessly communicating updates to the list of authorized license plate numbers to the memory from the one or more monitoring stations.

20. The method of claim 17, further comprising determining a number of occupied and empty parking spaces, floors, areas, or combinations thereof.

21. The method of claim 17, further comprising generating a report of a location of a specific vehicle within the parking area upon request.

22. The method of claim 21, wherein the corresponding one of the selected locations is located within a parking garage or lot, and wherein generating the report of the location of the specific vehicle within the parking area comprises identifying a parking space, floor, or section of the parking garage or lot at which the specific vehicle is located.

23. The method of claim 22, wherein determining whether each captured license plate number matches a license plate number in the list of authorized license plate numbers is performed in substantially real-time.

24. The method of claim 17, further comprising displaying at a monitoring station, the corresponding one of the locations of the parking are where the unauthorized vehicle is located.

25. The method of claim 17, wherein capturing the one or more license plates associated with one or more of the plurality of vehicles within the parking area comprises capturing a photograph, video, image, or a combination thereof of each of the one or more license plates substantially simultaneously with receiving the associated location identifier associated with the corresponding one of the selected locations by the RFID reader.

26. The method of claim 17, further comprising performing optical character recognition on each captured license plate and generating a license plate number prior to storing the license plate number.

27. A system for management of a parking area, comprising:
a plurality of RFID tags associated with and positioned at selected locations within the parking area;
an RFID reader configured to receive at least one location identifier generated by the RFID tags that is associated with each of the selected locations;
a license plate reader configured to scan for license plates of a plurality of vehicles within the selected locations of the parking area, wherein the license plate reader is configured to store the scanned license plate numbers associated with one or more of the plurality of vehicles within the parking area together with an associated location identifier for a corresponding one of the selected locations at which each of the license plate numbers is scanned in a memory;
a processor programmed to provide operations including:
comparing each scanned license plate number and associated location identifier associated with the corresponding one of the selected locations to a list of authorized license plate numbers stored in the memory and associated with the corresponding one of the selected locations stored in the RFID tags;
determining whether each scanned license plate number matches a license plate number in the list of authorized license plate numbers to verify a vehicle identified by each captured license plate number is authorized to park in one or more selected locations within the parking areas; and
generating an alert indicating an unauthorized vehicle is present in the corresponding one of the locations in response to a determined mismatch between at least one captured license plate number and the license plate numbers included in the list of authorized license plate numbers stored in the RFID tags.

28. The system of claim 27, wherein the memory is in communication with at least one monitoring station, and wherein the at least monitoring station is configured to wirelessly communicate updates to the list of authorized license plate numbers to the memory.

29. The system of claim 27, wherein the processor is further programed to:
determine a number of occupied and empty parking spaces, floors, areas, or combinations thereof; and
generate a report of a location of a specific vehicle within the parking area upon request.

30. The system of claim 29, wherein the corresponding one of the selected locations is located within a parking garage or lot, and wherein generating the report of the location of the specific vehicle within the parking area comprises identifying a parking space, floor, or section of the parking garage or lot at which the specific vehicle is located.

* * * * *